United States Patent [19]

Halasa et al.

[11] Patent Number: 5,534,592

[45] Date of Patent: Jul. 9, 1996

[54] HIGH PERFORMANCE BLEND FOR TIRE TREADS

[75] Inventors: Adel F. Halasa, Bath; Wen-Liang Hsu, Akron; David J. Zanzig, Uniontown; Paul H. Sandstrom, Tallmadge; Steven K. Henning, Cuyahoga Falls, all of Ohio; Danielle Lucas, Welsdorf, Luxembourg

[73] Assignee: The Goodyear Tire & Rubber Company, Akron, Ohio

[21] Appl. No.: 531,841

[22] Filed: Sep. 22, 1995

[51] Int. Cl.$^6$ .................. C08L 9/00; C08K 5/54
[52] U.S. Cl. .................. 525/236; 525/193; 525/194; 525/232; 525/332.6; 524/262; 524/571; 524/572; 152/209 R; 526/174
[58] Field of Search .................. 525/236, 232, 525/193, 194, 332.6; 524/262, 571, 572, 492, 495; 152/209 R

[56] References Cited

U.S. PATENT DOCUMENTS

| | | | |
|---|---|---|---|
| 3,864,430 | 2/1975 | Umeno et al. | 525/236 |
| 3,928,282 | 12/1975 | Lohr, Jr. et al. | 525/236 X |
| 4,530,959 | 7/1985 | Armbruster et al. | 525/236 X |
| 4,683,257 | 7/1987 | Kakiuchi et al. | 525/236 X |
| 4,843,120 | 6/1989 | Halasa et al. | 525/53 |
| 4,971,329 | 11/1990 | Llort et al. | 525/236 X |
| 5,047,483 | 9/1991 | Halasa et al. | 525/237 |
| 5,061,765 | 10/1991 | Hsu et al. | 526/141 |
| 5,137,998 | 8/1992 | Hsu et al. | 526/174 |
| 5,239,009 | 8/1993 | Halasa et al. | 525/258 |
| 5,272,220 | 12/1993 | Rodgers et al. | 525/332.3 |
| 5,405,927 | 4/1995 | Hsu et al. | 526/337 |
| 5,468,822 | 11/1995 | Tsujimoto et al. | 525/236 X |

*Primary Examiner*—Fred Teskin
*Attorney, Agent, or Firm*—Alvin T. Rockhill

[57] ABSTRACT

This invention reveals a high performance polybutadiene rubber blend comprised of (a) a first polybutadiene rubber, (b) a second polybutadiene rubber, and (c) a third polybutadiene rubber; wherein the first polybutadiene rubber, the second polybutadiene rubber, and the third polybutadiene rubber are selected from the group of consisting of super-high vinyl polybutadiene rubbers having a vinyl content which is within the range of 80 percent to 100 percent, high vinyl polybutadiene rubbers having a vinyl content which is within the range of 60 percent to 79 percent, medium vinyl polybutadiene rubbers having a vinyl content which is within the range of 35 percent to 59 percent, and low vinyl polybutadiene rubbers having a vinyl content which is within the range of 8 percent to 34 percent; wherein at least three members selected from the group consisting of super-high vinyl polybutadiene rubbers, high vinyl polybutadiene rubbers, medium vinyl polybutadiene rubbers, and low vinyl polybutadiene rubbers are included in the blend, wherein at least one of the polybutadiene rubbers in the blend has a vinyl content which is within 35 percentage points of the vinyl content of at least one other polybutadiene rubber in the blend, wherein the blend as a whole has a vinyl content of at least 40 percent, and wherein the blend contains at least 10 parts of the first polybutadiene rubber, at least 10 parts of the second polybutadiene rubber and at least 10 parts of the third polybutadiene rubber, based upon a total of 100 parts of rubber in the blend.

15 Claims, No Drawings

HIGH PERFORMANCE BLEND FOR TIRE TREADS

BACKGROUND OF THE INVENTION

It is highly desirable for tires to exhibit good traction characteristics on both dry and wet surfaces. However, it has traditionally been very difficult to improve the traction characteristics of a tire without compromising its rolling resistance and tread wear. Low rolling resistance is important because good fuel economy is virtually always an important consideration. Good tread wear is also an important consideration because it is generally the most important factor which determines the life of the tire.

The traction, tread wear, and rolling resistance of a tire is dependent to a large extent on the dynamic viscoelastic properties of the elastomers utilized in making the tire tread. In order to reduce the rolling resistance of a tire, rubbers having a high rebound have traditionally been utilized in making the tire's tread. On the other hand, in order to increase the wet skid resistance of a tire, rubbers which undergo a large energy loss have generally been utilized in the tire's tread. In order to balance these two viscoelastically inconsistent properties, mixtures of various types of synthetic and natural rubber are normally utilized in tire treads. For instance various mixtures of styrene-butadiene rubber and polybutadiene rubber are commonly used as a rubber material for automobile tire treads. However, such blends are not totally satisfactory for all purposes.

The inclusion of styrene-butadiene rubber (SBR) in tire tread formulations can significantly improve the traction characteristics of tires made therewith. However, styrene is a relatively expensive monomer and the inclusion of SBR is tire tread formulations leads to increased costs.

Carbon black is generally included in rubber compositions which are employed in making tires and most other rubber articles. It is desirable to attain the best possible dispersion of the carbon black throughout the rubber to attain optimized properties. It is also highly desirable to improve the interaction between the carbon black and the rubber. By improving the affinity of the rubber compound to the carbon black, physical properties can be improved. Silica can also be included in tire tread formulations to improve rolling resistance.

U.S. Pat. No. 4,843,120 discloses that tires having improved performance characteristics can be prepared by utilizing rubbery polymers having multiple glass transition temperatures as the tread rubber. These rubbery polymers having multiple glass transition temperatures exhibit a first glass transition temperature which is within the range of about −110° C. to −20° C. and exhibit a second glass transition temperature which is within the range of about −50° C. to 0° C. According to U.S. Pat. No. 4,843,120, these polymers are made by polymerizing at least one conjugated diolefin monomer in a first reaction zone at a temperature and under conditions sufficient to produce a first polymeric segment having a glass transition temperature which is between −110° C. and −20° C. and subsequently continuing said polymerization in a second reaction zone at a temperature and under conditions sufficient to produce a second polymeric segment having a glass transition temperature which is between −20° C. and 20° C. Such polymerizations are normally catalyzed with an organolithium catalyst and are normally carried out in an inert organic solvent.

U.S. Pat. No. 5,137,998 discloses a process for preparing a rubbery terpolymer of styrene, isoprene, and butadiene having multiple glass transition temperatures and having an excellent combination of properties for use in making tire treads which comprises: terpolymerizing styrene, isoprene and 1,3-butadiene in an organic solvent at a temperature of no more than about 40° C. in the presence of (a) at least one member selected from the group consisting of tripiperidino phosphine oxide and alkali metal alkoxides and (b) an organolithium compound.

U.S. Pat. No. 5,047,483 discloses a pneumatic tire having an outer circumferential tread where said tread is a sulfur cured rubber composition comprised of, based on 100 parts by weight rubber (phr), (A) about 10 to about 90 parts by weight of a styrene, isoprene, butadiene terpolymer rubber (SIBR), and (B) about 70 to about 30 weight percent of at least one of cis 1,4-polyisoprene rubber and cis 1,4-polybutadiene rubber wherein said SIBR rubber is comprised of (1) about 10 to about 35 weight percent bound styrene, (2) about 30 to about 50 weight percent bound isoprene and (3) about 30 to about 40 weight percent bound butadiene and is characterized by having a single glass transition temperature (Tg) which is in the range of about −10° C. to about −40° C. and, further the said bound butadiene structure contains about 30 to about 40 percent 1,2-vinyl units, the said bound isoprene structure contains about 10 to about 30 percent 3,4-units, and the sum of the percent 1,2-vinyl units of the bound butadiene and the percent 3,4-units of the bound isoprene is in the range of about 40 to about 70 percent.

U.S. Pat. No. 5,272,220 discloses a styrene-isoprene-butadiene rubber which is particularly valuable for use in making truck tire treads which exhibit improved rolling resistance and tread wear characteristics, said rubber being comprised of repeat units which are derived from about 5 weight percent to about 20 weight percent styrene, from about 7 weight percent to about 35 weight percent isoprene, and from about 55 weight percent to about 88 weight percent 1,3-butadiene, wherein the repeat units derived from styrene, isoprene and 1,3-butadiene are in essentially random order, wherein from about 25% to about 40% of the repeat units derived from the 1,3-butadiene are of the cis-microstructure, wherein from about 40% to about 60% of the repeat units derived from the 1,3-butadiene are of the transmicrostructure, wherein from about 5% to about 25% of the repeat units derived from the 1,3-butadiene are of the vinyl-microstructure, wherein from about 75% to about 90% of the repeat units derived from the isoprene are of the 1,4-microstructure, wherein from about 10% to about 25% of the repeat units derived from the isoprene are of the 3,4-microstructure, wherein the rubber has a glass transition temperature which is within the range of about −90° C. to about −70° C., wherein the rubber has a number average molecular weight which is within the range of about 150,000 to about 400,000, wherein the rubber has a weight average molecular weight of about 300,000 to about 800,000, and wherein the rubber has an inhomogeneity which is within the range of about 0.5 to about 1.5.

U.S. Pat. No. 5,239,009 reveals a process for preparing a rubbery polymer which comprises: (a) polymerizing a conjugated diene monomer with a lithium initiator in the substantial absence of polar modifiers at a temperature which is within the range of about 5° C. to about 100° C. to produce a living polydiene segment having a number average molecular weight which is within the range of about 25,000 to about 350,000; and (b) utilizing the living polydiene segment to initiate the terpolymerization of 1,3-butadiene, isoprene, and styrene, wherein the terpolymerization is conducted in the presence of at least one polar modifier at a temperature which is within the range of about 5° C. to about 70° C. to produce a final segment which is comprised of repeat units which are derived from 1,3-butadiene, isoprene, and styrene, wherein the final segment has a number average molecular weight which is within the range of about 25,000 to about 350,000. The rubbery polymer made by this process is reported to be useful for improving the wet skid resistance and traction characteristics of tires without sacrificing tread wear or rolling resistance.

U.S. Pat. No. 5,061,765 discloses isoprene-butadiene copolymers having high vinyl contents which can reportedly be employed in building tires which have improved traction, rolling resistance, and abrasion resistance. These high vinyl isoprene-butadiene rubbers are synthesized by copolymerizing 1,3-butadiene monomer and isoprene monomer in an organic solvent at a temperature which is within the range of about −10° C. to about 100° C. in the presence of a catalyst system which is comprised of (a) an organoiron compound, (b) an organoaluminum compound, (c) a chelating aromatic amine, and (d) a protonic compound; wherein the molar ratio of the chelating amine to the organoiron compound is within the range of about 0.1:1 to about 1:1, wherein the molar ratio of the organoaluminum compound to the organoiron compound is within the range of about 5:1 to about 200:1, and herein the molar ratio of the protonic compound to the organoaluminum compound is within the range of about 0.001:1 to about 0.2:1.

U.S. Pat. No. 5,405,927 discloses an isoprene-butadiene rubber which is particularly valuable for use in making truck tire treads, said rubber being comprised of repeat units which are derived from about 20 weight percent to about 50 weight percent isoprene and from about 50 weight percent to about 80 weight percent 1,3-butadiene, wherein the repeat units derived from isoprene and 1,3-butadiene are in essentially random order, wherein from about 3% to about 10% of the repeat units in said rubber are 1,2-polybutadiene units, wherein from about 50% to about 70% of the repeat units in said rubber are 1,4-polybutadiene units, wherein from about 1% to about 4% of the repeat units in said rubber are 3,4-polyisoprene units, wherein from about 25% to about 40% of the repeat units in the polymer are 1,4-polyisoprene units, wherein the rubber has a glass transition temperature which is within the range of about −90° C. to about −75° C., and wherein the rubber has a Mooney viscosity which is within the range of about 55 to about 140.

SUMMARY OF THE INVENTION

The high performance polybutadiene rubber blends of this invention have excellent properties for incorporation into the rubber compounds used in making tire treads. The polybutadiene blends of this invention can be employed to improve the wet skid resistance and traction characteristics of tires without sacrificing tread wear or rolling resistance. A highly desirable combination of tire characteristics can be attained without utilizing styrene-butadiene rubber.

The present invention more specifically discloses a high performance polybutadiene rubber blend for utilization in manufacturing tire tread compounds which is comprised of (a) a first polybutadiene rubber, (b) a second polybutadiene rubber, and (c) a third polybutadiene rubber; wherein the first polybutadiene rubber, the second polybutadiene rubber, and the third polybutadiene rubber are selected from the group consisting of super-high vinyl polybutadiene rubbers having a vinyl content which is within the range of 80 percent to 100 percent, high vinyl polybutadiene rubbers having a vinyl content which is within the range of 60 percent to 79 percent, medium vinyl polybutadiene rubbers having a vinyl content which is within the range of 35 percent to 59 percent, and low vinyl polybutadiene rubbers having a vinyl content which is within the range of 8 percent to 34 percent; wherein at least three members selected from the group consisting of super-high vinyl polybutadiene rubbers, high vinyl polybutadiene rubbers, medium vinyl polybutadiene rubbers, and low vinyl polybutadiene rubbers are included in the blend, wherein at least one of the polybutadiene rubbers in the blend has a vinyl content which is within 35 percentage points of the vinyl content of at least one other polybutadiene rubber in the blend, wherein the vinyl content of the first polybutadiene rubber differs from the vinyl content of the second polybutadiene rubber and the third polybutadiene rubber by at least 5 percentage points, wherein the vinyl content of the second polybutadiene rubber differs from the vinyl content of the third polybutadiene rubber by at least 5 percentage points, wherein the blend as a whole has a total vinyl content of at least 40 percent, and wherein the blend contains at least 10 parts of the first polybutadiene rubber, at least 10 parts of the second polybutadiene rubber and at least 10 parts of the third polybutadiene rubber, based upon a total of 100 parts of rubber in the blend.

The various polybutadiene rubbers employed in the blends of this invention can be made utilizing the techniques of this invention to attain various desired vinyl contents. The subject invention further discloses a process for preparing high vinyl polybutadiene rubber which comprises: polymerizing 1,3-butadiene monomer with a lithium initiator at a temperature which is within the range of about 5° C. to about 100° C. in the presence of a sodium alkoxide and a polar modifier, wherein the molar ratio of the sodium alkoxide to the polar modifier is within the range of about 0.1:1 to about 10:1; and wherein the molar ratio of the sodium alkoxide to the lithium initiator is within the range of about 0.05:1 to about 10:1.

The subject invention also specifically discloses an initiator system which is comprised of (a) a lithium initiator, (b) a sodium alkoxide, and (c) a polar modifier; wherein the molar ratio of the sodium alkoxide to the polar modifier is within the range of about 0.1:1 to about 10:1; and wherein the molar ratio of the sodium alkoxide to the lithium initiator is within the range of about 0.01:1 to about 20:1.

DETAILED DESCRIPTION OF THE INVENTION

The super-high vinyl polybutadiene rubbers, high vinyl polybutadiene rubbers, medium vinyl polybutadiene rubbers, and low vinyl polybutadiene rubbers which can be employed in the blends of this invention are typically synthesized by anionic polymerization in an organic medium. The polymerization is normally carried out in an inert organic medium utilizing a lithium catalyst. The vinyl content of the polybutadiene rubber made is controlled by the amount of modifier system present during the polymerization step.

The inert organic medium which is utilized as the solvent will typically be a hydrocarbon which is liquid at ambient temperatures which can be one or more aromatic, paraffinic or cycloparaffinic compounds. These solvents will normally contain from 4 to 10 carbon atoms per molecule and will be liquids under the conditions of the polymerization. It is, of course, important for the solvent selected to be inert. The term "inert" as used herein means that the solvent does not interfere with the polymerization reaction or react with the polymers made thereby. Some representative examples of suitable organic solvents include pentane, isooctane, cyclohexane, normal hexane, benzene, toluene, xylene, ethylbenzene and the like, alone or in admixture. Saturated aliphatic solvents, such as cyclohexane and normal hexane, are most preferred.

The lithium catalysts which can be used are typically organolithium compounds. The organolithium compounds which are preferred can be represented by the formula: R-Li, wherein R represents a hydrocarbyl radical containing from 1 to about 20 carbon atoms. Generally, such monofunctional organolithium compounds will contain from 1 to about 10 carbon atoms. Some representative examples of organolithium compounds which can be employed include methyllithium, ethyllithium, isopropyllithium, n-butyllithium, sec-butyllithium, n-octyllithium, tert-octyllithium, n-decyllithium, phenyllithium, 1-napthyllithium, 4-butylphenyllithium, p-tolyllithium, 1-naphthyllithium, 4-butylphenyllithium, p-tolyllithium, 4-phenylbutyllithium, cyclohexyllithium, 4-butylcyclohexyllithium, and 4-cyclohexylbutyllithium. Organo monolithium compounds, such as alkyllithium compounds and aryllithium compounds, are usually employed. Some representative examples of preferred organo monolithium compounds that can be utilized include ethylaluminum, isopropylaluminum, n-butyllithium, secondary-butyllithium, normal-hexyllithium, tertiary-octyllithium, phenyllithium, 2-napthyllithium, 4-butylphenyllithium, 4-phenylbutyllithium, cyclohexyllithium, and the like. Normal-butyllithium and secondary-butyllithium are highly preferred lithium initiators.

The amount of lithium catalyst utilized will vary from one organolithium compound to another and with the molecular weight that is desired for the polybutadiene rubber being synthesized. As a general rule in all anionic polymerizations, the molecular weight (Mooney viscosity) of the polymer produced is inversely proportional to the amount of catalyst utilized. As a general rule, from about 0.01 phm (parts per hundred parts by weight of monomer) to 1 phm of the lithium catalyst will be employed. In most cases, from 0.01 phm to 0.1 phm of the lithium catalyst will be employed with it being preferred to utilize 0.025 phm to 0.07 phm of the lithium catalyst.

Normally, from about 5 weight percent to about 35 weight percent of the 1,3-butadiene monomer will be charged into the polymerization medium (based upon the total weight of the polymerization medium including the organic solvent and monomer). In most cases, it will be preferred for the polymerization medium to contain from about 10 weight percent to about 30 weight percent monomer. It is typically more preferred for the polymerization medium to contain from about 20 weight percent to about 25 weight percent monomer.

The 1,3-butadiene will be polymerized at a temperature which is within the range of about 5° C. to about 100° C. The polymerization temperature will preferably be within the range of about 40° C. to about 90° C. for practical reasons and to attain the desired microstructure. Temperatures within the range of about 60° C. to about 80° C. are most preferred. The microstructure of the polybutadiene rubber being prepared is somewhat dependent upon the polymerization temperature.

The polymerization is allowed to continue until essentially all of the 1,3-butadiene monomer has been exhausted. In other words, the polymerization is allowed to run to completion. Since a lithium catalyst is employed to polymerize the 1,3-butadiene monomer, a living polybutadiene rubber is produced. The living polybutadiene rubber synthesized will have a number average molecular weight which is within the range of about 25,000 to about 700,000. The polybutadiene rubber synthesized will more typically have a number average molecular weight which is within the range of about 150,000 to about 400,000.

To increase the level of vinyl content the polymerization can be carried out in the presence of at least one polar modifier. Ethers and tertiary amines which act as Lewis bases are representative examples of polar modifiers that can be utilized. Some specific examples of typical polar modifiers include diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine, N-methyl morpholine, N-ethyl morpholine, N-phenyl morpholine and the like.

The modifier can also be a 1,2,3-trialkoxybenzene or a 1,2,4-trialkoxybenzene. Some representative examples of 1,2,3-trialkoxybenzenes that can be used include 1,2,3-trimethoxybenzene, 1,2,3-triethoxybenzene, 1,2,3-tributoxybenzene, 1,2,3-trihexoxybenzene, 4,5,6-trimethyl-1,2,3-trimethoxybenzene, 4,5,6-tri-n-pentyl-1,2,3-triethoxybenzene, 5-methyl-1,2,3-trimethoxybenzene, and 5-propyl-1,2,3-trimethoxybenzene. Some representative examples of 1,2,4-trialkoxybenzenes that can be used include 1,2,4-trimethoxybenzene, 1,2,4-triethoxybenzene, 1,2,4-tributoxybenzene, 1,2,4-tripentoxybenzene, 3,5,6-trimethyl-1,2,4-trimethoxybenzene, 5-propyl-1,2,4-trimethoxybenzene, and 3,5-dimethyl-1,2,4-trimethoxybenzene. Dipiperidinoethane, dipyrrolidinoethane, tetramethylethylene diamine, diethylene glycol, dimethyl ether and tetrahydrofuran are representative of highly preferred modifiers. U.S. Pat. No. 4,022,959 describes the use of ethers and tertiary amines as polar modifiers in greater detail.

The utilization of 1,2,3-trialkoxybenzenes and 1,2,4-trialkoxybenzenes as modifiers is described in greater detail in U.S. Pat. No. 4,696,986. The teachings of U.S. Pat. No. 4,022,959 and United States Pat. No. 4,696,986 are incorporated herein by reference in their entirety. The microstructure of the repeat units which are derived from butadiene monomer is a function of the polymerization temperature and the amount of polar modifier present. For example, it is known that higher temperatures result in lower vinyl contents (lower levels of 1,2-microstructure). Accordingly, the polymerization temperature, quantity of modifier and specific modifier selected will be determined with the ultimate desired microstructure of the polybutadiene rubber being synthesized being kept in mind.

In cases where super-high vinyl polybutadiene rubber is being synthesized a combination of a sodium alkoxide and polar modifier will normally be employed as the modifier system. It has been unexpectedly found that a combination of a sodium alkoxide and polar modifier acts synergistically to increase the vinyl content of polybutadiene rubber synthesized in its presence. The utilization of this synergistic modifier system can also be employed advantageously in the synthesis of high vinyl polybutadiene rubber.

The sodium alkoxides which can be utilized in the catalyst system will normally be of the formula NaOR, wherein R is an alkyl group containing from about 2 to about 12 carbon atoms. The sodium metal alkoxide will typically contain from about 2 to about 12 carbon atoms. It is generally preferred for the sodium alkoxide to contain from about 3 to about 8 carbon atoms. It is generally most preferred for the sodium alkoxide to contain from about 4 to about 6 carbon atoms. Sodium t-amyloxide (sodium t-pentoxide) is a representative example of a preferred sodium alkoxides which can be utilized in the modifier systems of this invention.

The molar ratio of the sodium alkoxide to the polar modifier in the modifier system will normally be within the range of about 0.1:1 to about 10:1 and the molar ratio of the sodium alkoxide to the lithium initiator will normally be within the range of about 0.01:1 to about 20:1. It is generally preferred for the molar ratio of the sodium alkoxide to the polar modifier to be within the range of about 0.2:1 to about 5:1 and for the molar ratio of the sodium alkoxide to the lithium initiator to be within the range of about 0.05:1 to about 10:1. It is generally more preferred for the molar ratio of the sodium alkoxide to the polar modifier to be within the range of about 0.5:1 to about 1:1 and for the molar ratio of the sodium alkoxide to the lithium initiator to be within the range of about 0.2:1 to about 3:1.

After the copolymerization has been completed, the polybutadiene rubber can be recovered from the organic solvent. The polybutadiene rubber can be recovered from the organic solvent and residue by any means, such as decantation, filtration, centrification and the like. It is often desirable to precipitate the polybutadiene rubber from the organic solvent by the addition of lower alcohols containing from about 1 to about 4 carbon atoms to the polymer solution. Suitable lower alcohols for precipitation of the polybutadiene rubber from the polymer cement include methanol, ethanol, isopropyl alcohol, normal-propyl alcohol and t-butyl alcohol. The utilization of lower alcohols to precipitate the polybutadiene rubber from the polymer cement also "kills" the living polymer by inactivating lithium end groups. After the polybutadiene rubber is recovered from the solution, steam stripping can be employed to reduce the level of volatile organic compounds in the polymer.

There are valuable benefits associated with utilizing the specific polybutadiene rubber blend of this invention in making tire tread compounds. Tire tread compounds can be made using only the polybutadiene rubbers of this invention without the need to blend additional rubbers, such as styrene-butadiene rubber, therein.

The high performance polybutadiene rubber blends of this invention contain at least three different polybutadiene rubbers having different vinyl contents. The blend can include: (1) super-high vinyl polybutadiene rubber which has a vinyl content which is within the range of 80 percent to 100 percent and a glass transition temperature which is within the range of about $-15°$ C. to about $0°$ C., (2) high vinyl polybutadiene rubber which has a vinyl content which is within the range of 60 percent to 79 percent and a glass transition temperature which is within the range of about $-45°$ C. to about $-40°$ C., (3) medium vinyl polybutadiene rubber which has a vinyl content which is within the range of 35 percent to 59 percent and a glass transition temperature which is within the range of about $-75°$ C. to about $-45°$ C., and (4) low vinyl polybutadiene rubber which has a vinyl content which is within the range of 8 percent to 34 percent and a glass transition temperature which is within the range of about $-95°$ C. to about $-75°$ C. However, it is critical for the blend to contain at least three of the four members of the group consisting of super-high vinyl polybutadiene rubber, high vinyl polybutadiene rubber, medium vinyl polybutadiene rubber, and low vinyl polybutadiene rubber.

It is also critical for at least one of the polybutadiene rubbers in the blend to have a vinyl content which is within 35 percentage points of the vinyl content of at least one other polybutadiene rubber in the blend to provide compatibility. It is preferred for at least one of the polybutadiene rubbers in the blend to have a vinyl content which is within 30 percentage points of the vinyl content of at least one other polybutadiene rubber in the blend. It is more preferred for at least one of the polybutadiene rubbers in the blend to have a vinyl content which is within 25 percentage points of the vinyl content of at least one other polybutadiene rubber in the blend. For instance, it would be highly preferred for the blend to contain a super-high vinyl polybutadiene rubber having a vinyl content of 90 percent and a high vinyl polybutadiene rubber having a vinyl content of 65 percent (the vinyl content of the high vinyl polybutadiene rubber differs from the vinyl content of the super-high vinyl polybutadiene by only 25 percentage points).

It is also important for the three different polybutadiene rubbers employed in the blend to have vinyl contents which differ from the other two polybutadiene rubbers employed in the blend by at least 5 percentage points. In other words, the vinyl contents of the different polybutadiene rubbers utilized in the blend must differ by at least 5 percentage points. For example, if a super-high vinyl polybutadiene rubber having a vinyl content of 80 percent and a high vinyl polybutadiene rubber are employed in the blend, the vinyl content of the high vinyl polybutadiene must be less than 75 percent. It is preferred for the three different polybutadiene rubbers employed in the blend to have vinyl contents which differ from the other two polybutadiene rubbers employed in the blend by at least 10 percentage points. Thus, it would be highly preferred to utilize a super-high vinyl polybutadiene rubber having a Vinyl content of 85 percent and a high vinyl polybutadiene rubber having a vinyl content of 70 percent in the blend (there is a 15 percentage point difference between the vinyl contents of the two polybutadiene rubbers. Stated in still another way, the vinyl content of the first polybutadiene rubber can not have a vinyl content which is within 5 percentage points of the vinyl content of the second polybutadiene rubber or the third polybutadiene rubber, and the vinyl content of the second polybutadiene rubber can not have a vinyl content which is within 5 percentage points of the vinyl content of the third polybutadiene rubber.

It is also important for the blend as a whole to have a total vinyl content of at least 40 percent and preferably 45 percent. The total vinyl content of the blend as a whole is the sum of the products of the number of parts of each of the polybutadiene rubbers included in the blend and the vinyl contents of those polybutadiene rubbers, with that sum being divided by the total number of parts of polybutadiene rubber included in the blend. For example, if the blend included 40 parts of a low vinyl polybutadiene rubber having a vinyl content of 20 percent, 40 parts of a medium vinyl polybutadiene rubber having a vinyl content of 40 percent, and 20 parts of a super-high vinyl polybutadiene rubber having a vinyl content of 80 percent, the blend as a whole would have a total vinyl content of 40 percent. In another example, if the blend included 20 parts of a low vinyl polybutadiene rubber having a vinyl content of 30 percent, 40 parts of a high vinyl polybutadiene rubber having a vinyl content of 60 percent, and 40 parts of a super-high vinyl polybutadiene rubber having a vinyl content of 90 percent, the blend as a whole would have a total vinyl content of 66 percent.

The blends of this invention will contain at least 10 phr (parts per 100 parts by weight of rubber) of the first polybutadiene rubber, at least 10 phr of the second polybutadiene rubber, and at least 10 phr of the third polybutadiene rubber. The blends of this invention will preferably contain at least 20 phr of the first polybutadiene rubber, at least 20 phr of the second polybutadiene rubber, and at least 20 phr of the third polybutadiene rubber. The blends of this invention will more preferably contain at least 25 phr of the first polybutadiene rubber, at least 25 phr of the second polybutadiene rubber, and at least 25 phr of the third polybutadiene rubber.

The polybutadiene rubber blends of this invention can be compounded utilizing conventional ingredients and standard techniques. For instance, the polybutadiene rubber blends will typically be mixed with carbon black and/or silica, sulfur, fillers, accelerators, oils, waxes, scorch inhibiting agents, and processing aids. In most cases, the polybutadiene rubber blends will be compounded with sulfur and/or a sulfur containing compound, at least one filler, at least one accelerator, at least one antidegradant, at least one processing oil, zinc oxide, optionally a tackifier resin, optionally a reinforcing resin, optionally one or more fatty acids, optionally a peptizer and optionally one or more scorch inhibiting agents. Such blends will normally contain from about 0.5 to 5 phr (parts per hundred parts of rubber by weight) of sulfur and/or a sulfur containing compound with 1 phr to 2.5 phr being preferred. It may be desirable to utilize insoluble sulfur in cases where bloom is a problem.

Normally from 10 to 150 phr of at least one filler will be utilized in the blend with 30 to 80 phr being preferred. In most cases at least some carbon black will be utilized in the filler. The filler can, of course, be comprised totally of carbon black. Silica can be included in the filler to improve tear resistance and heat build up. Clays and/or talc can be included in the filler to reduce cost. The blend will also normally include from 0.1 to 2.5 phr of at least one accelerator with 0.2 to 1.5 phr being preferred. Antidegradants, such as antioxidants and antiozonants, will generally be included in the tread compound blend in amounts ranging from 0.25 to 10 phr with amounts in the range of 1 to 5 phr being preferred. Processing oils will generally be included in the blend in amounts ranging from 2 to 100 phr with amounts ranging from 5 to 50 phr being preferred. The polybutadiene blends of this invention will also normally contain from 0.5 to 10 phr of zinc oxide with 1 to 5 phr being preferred. These blends can optionally contain from 0 to 10 phr of tackifier resins, 0 to 10 phr of reinforcing resins, 1 to 10 phr of fatty acids, 0 to 2.5 phr of peptizers, and 0 to 1 phr of scorch inhibiting agents.

To fully realize the total advantages of the blends of this invention silica will normally be included in the tread rubber formulation. The processing of the polybutadiene rubber blend is normally conducted in the presence of a sulfur containing organosilicon compound to realize maximum benefits. Examples of suitable sulfur containing organosilicon compounds are of the formula:

$$Z\text{-Alk-}S_n\text{-Alk-}Z \quad (I)$$

in which Z is selected from the group consisting of

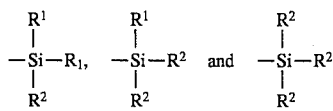

where $R^1$ is an alkyl group of 1 to 4 carbon atoms, cyclohexyl or phenyl; wherein $R^2$ is alkoxy of 1 to 8 carbon atoms, or cycloalkoxy of 5 to 8 carbon atoms; and wherein Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl)disulfide, 3,3'-bis(triethoxysilylpropyl)tetrasulfide, 3,3'-bis(triethoxysilylpropyl)octasulfide, 3,3'-bis(trimethoxysilylpropyl)tetrasulfide, 2,2'bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl)hexasulfide, 3,3'-bis(trimethoxysilylpropyl)octasulfide, 3,3'-bis(trioctoxysilylpropyl)tetrasulfide, 3,3'-bis(trihexoxysilylpropyl)disulfide, 3,3'-bis(tri-2"-ethylhexoxysilylpropyl)trisulfide, 3,3'-bis(triisooctoxysilylpropyl)tetrasulfide, 3,3'-bis(tri-t-butoxysilylpropyl)disulfide, 2,2'-bis(methoxy diethoxy silyl ethyl)tetrasulfide, 2,2'-bis(tripropoxysilylethyl)pentasulfide, 3,3'-bis(tricyclonexoxysilylpropyl)tetrasulfide, 3,3'-bis(tricyclopentoxysilylpropyl)trisulfide, 2,2'-bis(tri-2"-methylcyclohexoxysilylethyl)tetrasulfide, bis(trimethoxysilylmethyl)tetrasulfide, 3-methoxy ethoxy propoxysilyl 3'-diethoxybutoxysilylpropyltetrasulfide, 2,2'-bis(dimethyl methoxysilylethyl)disulfide, 2,2'-bis(dimethyl sec.butoxysilylethyl)trisulfide, 3,3'-bis(methyl butylethoxysilylpropyl)tetrasulfide, 3,3'-bis(di t-butylmethoxysilylpropyl)tetrasulfide, 2,2'-bis(phenyl methyl methoxysilylethyl)trisulfide, 3,3'-bis(diphenyl isopropoxysilylpropyl)tetrasulfide, 3,3'-bis(diphenyl cyclohexoxysilylpropyl)disulfide, 3,3'-bis(dimethyl ethylmercaptosilylpropyl) tetrasulfide, 2,2'-bis(methyl dimethoxysilylethyl)trisulfide, 2,2'-bis(methyl ethoxypropoxysilylethyl)tetrasulfide, 3,3'-bis(diethyl methoxysilylpropyl)tetrasulfide, 3,3'-bis(ethyl di-sec.butoxysilylpropyl)disulfide, 3,3'-bis(propyl diethoxysilylpropyl)disulfide, 3,3'-bis(butyl dimethoxysilylpropyl)trisulfide, 3,3'-bis(phenyl dimethoxysilylpropyl)tetrasulfide, 3-phenyl ethoxybutoxysilyl 3'-trimethoxysilylpropyl tetrasulfide, 4,4'-bis(trimethoxysilylbutyl)tetrasulfide, 6,6'-bis(triethoxysilylhexyl)tetrasulfide, 12,12'-bis(triisopropoxysilyl dodecyl)disulfide, 18,18'-bis(trimethoxysilyloctadecyl)tetrasulfide, 18,18'-bis(tripropoxysilyloctadecenyl)tetrasulfide, 4,4'-bis(trimethoxysilyl-buten-2-yl)tetrasulfide, 4,4'-bis(trimethoxysilylcyclohexylene)tetrasulfide, 5,5'-bis(dimethoxymethylsilylpentyl)trisulfide, 3,3'-bis(trimethoxysilyl-2-methylpropyl)tetrasulfide, 3,3'-bis(dimethoxyphenylsilyl-2-methylpropyl)disulfide.

The preferred sulfur containing organosilicon compounds are the 3,3'-bis(trimethoxy or triethoxy silylpropyl) sulfides. The most preferred compound is 3,3'-bis(triethoxysilylpropyl)tetrasulfide. Therefore as to formula I, preferably Z is

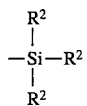

where $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred.

The amount of the sulfur containing organosilicon compound of formula I in a rubber composition will vary depending on the level of silica that is used. Generally speaking, the amount of the compound of formula I will range from about 0.01 to about 1.0 parts by weight per part by weight of the silica. Preferably, the amount will range from about 0.02 to about 0.4 parts by weight per part by weight of the silica. More preferably the amount of the compound of formula I will range from about 0.05 to about 0.25 parts by weight per part by weight of the silica.

In addition to the sulfur containing organosilicon, the rubber composition should contain a sufficient amount of silica, and carbon black, if used, to contribute a reasonably high modulus and high resistance to tear. The silica filler may be added in amounts ranging from about 10 phr to about 250 phr. Preferably, the silica is present in an amount ranging from about 15 phr to about 80 phr. If carbon black is also present, the amount of carbon black, if used, may vary. Generally speaking, the amount of carbon black will vary from about 5 phr to about 80 phr. Preferably, the amount of carbon black will range from about 10 phr to about 40 phr. It is to be appreciated that the silica coupler may be used in conjunction with a carbon black, namely pre-mixed with a carbon black prior to addition to the rubber composition, and such carbon black is to be included in the aforesaid amount of carbon black for the rubber composition formulation. In any case, the total quantity of silica and carbon black will be at least about 30 phr. The combined weight of the silica and carbon black, as hereinbefore referenced, may be as low as about 30 phr, but is preferably from about 45 to about 130 phr.

The commonly employed siliceous pigments used in rubber compounding applications can be used as the silica in this invention, including pyrogenic and precipitated siliceous pigments (silica), although precipitate silicas are preferred. The siliceous pigments preferably employed in this invention are precipitated silicas such as, for example, those obtained by the acidification of a soluble silicate, e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 400, and more usually about 150 to about 300. The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3.

Tire tread formulations which include silica and an organosilicon compound will typically be mixed utilizing a thermomechanical mixing technique. The mixing of the tire tread rubber formulation can be accomplished by methods known to those having skill in the rubber mixing art. For example the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The rubber, silica and sulfur containing organosilicon, and carbon black if used, are mixed in one or more non-productive mix stages. The terms "non-productive" and "productive" mix stages are well known to those having skill in the rubber mixing art. The sulfur vulcanizable rubber composition containing the sulfur containing organosilicon compound, vulcanizable rubber and generally at least part of the silica should be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be for a duration of time which is within the range of about 2 minutes to about 20 minutes. It will normally be preferred for the rubber to reach a temperature which is within the range of about 145° C. to about 180° C. and to be maintained at said temperature for a period of time which is within the range of about 4 minutes to about 12 minutes. It will normally be more preferred for the rubber to reach a temperature which is within the range of about 155° C. to about 170° C. and to be maintained at said temperature for a period of time which is within the range of about 5 minutes to about 10 minutes.

The polybutadiene rubber blend containing tire tread compounds of this invention can be used in tire treads in conjunction with ordinary tire manufacturing techniques. Tires are built utilizing standard procedures with the polybutadiene rubber blend simply being substituted for the rubber compounds typically used as the tread rubber. After the tire has been built with the polybutadiene rubber containing blend, it can be vulcanized using a normal tire cure cycle. Tires made in accordance with this invention can be cured over a wide temperature range. However, it is generally preferred for the tires of this invention to be cured at a temperature ranging from about 132° C. (270° F.) to about 166° C. (330° F.). It is more typical for the tires of this invention to be cured at a temperature ranging from about 143° C. (290° F.) to about 154° C. (310° F.). It is generally preferred for the cure cycle used to vulcanize the tires of this invention to have a duration of about 10 to about 20 minutes with a cure cycle of about 12 to about 18 minutes being most preferred.

By utilizing the polybutadiene rubber blends of this invention in tire tread compounds traction characteristics can be improved without compromising tread wear or rolling resistance. Since the polybutadiene rubber blends of this invention do not contain styrene the cost of raw materials can also be reduced. This is because styrene and other vinyl aromatic monomers are expensive relative to the cost of 1,3-butadiene.

This invention is illustrated by the following examples which are merely for the purpose of illustration and are not to be regarded as limiting the scope of the invention or the manner in which it can be practiced. Unless specifically indicated otherwise, all parts and percentages are given by weight.

EXAMPLE 1

In this experiment, 1500 g of a silica/alumina/molecular sieve dried premix containing 12.4 weight percent 1,3-butadiene in hexane was charged into a one-gallon (3.8 liters) reactor. After the impurity level of 1.5 ppm was determined, 2.76 ml of 1M solution of N,N,N',N'-tetramethylethylene diamine (TMEDA) in hexane, 1.84 ml 0.5M solution of sodium-t-amylate (STA) in hexane and 1.15 ml of a 0.91M solution of n-butyllithium (in hexane; 1.01 ml for initiation and 0.14 ml for scavenging the premix) were added to the reactor. The molar ratio of TMEDA to STA and to n-butyllithium was 3:1:1.

The polymerization was carried out at 75° C. for 10 minutes. The GC analysis of the residual monomer contained in the polymerization mixture indicated that the polymerization was complete at this time. Then, three ml of 1M ethanol solution (in hexane) was added to the reactor to shortstop the polymerization and polymer was removed from the reactor and stabilized with 1 phm of antioxidant. After evaporating hexane, the resulting polymer was dried in a vacuum oven at 50° C.

The polybutadiene produced was determined to have a glass transition temperature (Tg) at −27° C. It was then determined to have a microstructure which contained 82 percent 1,2-polybutadiene units and 18 percent 1,4-polybutadiene units. The Mooney ML-4 viscosity ML-4 at 100° C. was 54 for this polybutadiene.

EXAMPLES 2–6

The procedure described in Example 1 was utilized in these examples except that the TMEDA/STA/n-butyllithium ratio was varied. The Tgs and microstructures of the resulting polybutadienes are listed in Table I.

TABLE I

| Ex. | TMEDA/STA/ n-BuLi Ratio | Tg (°C.) | Mooney ML-4 | Microstructure 1,2-PBd | 1,4-PBd |
|---|---|---|---|---|---|
| 1 | 3:1:1 | −28 | 54 | 82 | 18 |
| 2 | 3:2:1 | −27 | 65 | 83 | 17 |
| 3 | 3:3:1 | −27 | 68 | 82 | 18 |
| 4 | 3:0.5:1 | −28 | 50 | 82 | 18 |
| 5 | 2:1:1 | −27 | 50 | 82 | 18 |
| 6 | 5:1:1 | −27 | 57 | 83 | 17 |

EXAMPLE 7

The procedure described in Example 1 was utilized in this example except that TMEDA was used as the modifier. It took about 60 minutes to complete the polymerization. The polymer was determined to have a Tg at −45° C. It was also determined to have a microstructure which contained 63 percent 1,2-polybutadiene units and 37 percent 1,4-polybutadiene units.

EXAMPLE 8

The procedure described in Example 1 was utilized in this example except that TMEDA was used as the modifier and the TMEDA to n-butyl-lithium ratio was changed to 1:1. It took about 75 minutes to complete the polymerization. The polymer was determined to have a Tg at −63° C. It was also determined to have a microstructure which contained 50 percent 1,2-polybutadiene units and 50 percent 1,4-polybutadiene units.

EXAMPLES 9–14

The super-high vinyl polybutadiene rubber made in Example 1, the high vinyl polybutadiene rubber made in Example 7, and the medium vinyl polybutadiene rubber made in Example 8 were blended together and compounded utilizing a standard tire tread test formulation and compared to tire tread formulations made with a blend of solution styrene-butadiene rubber and high cis-1,4-polybutadiene rubber. The tire tread test formulations were made by mixing the ingredients shown in Table II. Example 9 was carried out as a comparative example and with the rubber component being a blend of solution styrene-butadiene rubber and high cis-1,4-polybutadiene rubber.

TABLE II

| Example | 9 | 10 | 11 | 12 | 13 | 14 |
|---|---|---|---|---|---|---|
| SBR[1] | 70 | — | — | — | — | — |
| Cis-1,4-PBD[2] | 30 | — | — | — | — | — |
| MVPBD[3] | — | 50 | 30 | 50 | 30 | 20 |
| HVPBD[4] | — | 30 | 50 | 30 | 50 | 70 |
| SHVPBD[5] | — | 20 | 20 | 20 | 20 | 10 |
| carbon black | 70 | 70 | 70 | — | — | — |
| Silica | — | — | — | 70 | 70 | 70 |
| Coupling Agent[6] | — | — | — | 11 | 11 | 11 |
| wax | 2 | 2 | 2 | 2 | 2 | 2 |
| Oil | 28 | 28 | 28 | 28 | 28 | 28 |
| zinc oxide | 3.5 | 3.5 | 3.5 | 3.5 | 3.5 | 3.5 |
| stearic acid | 2 | 2 | 2 | 2 | 2 | 2 |
| 6-PPD[7] | 1 | 1 | 1 | 1 | 1 | 1 |
| CBS[8] | 1.7 | 1.7 | 1.7 | 1.7 | 1.7 | 1.7 |
| DPG[9] | 2 | 2 | 2 | 2 | 2 | 2 |
| sulfur | 1.4 | 1.4 | 1.4 | 1.4 | 1.4 | 1.4 |
| Antioxidant | 1 | 1 | 1 | 1 | 1 | 1 |

[1]The solution styrene-butadiene rubber contained 10% bound styrene.
[2]The high cis-1,4-polybutadiene rubber was Budene ® 1207 polybutadiene rubber.
[3]MVPBD represents medium vinyl polybutadiene rubber having a vinyl content of about 50 percent.
[4]HVPBD represents high vinyl polybutadiene rubber having a vinyl content of about 63 percent.
[5]SHVPBD represents super-high vinyl polybutadiene rubber having a vinyl content of about 82 percent.
[6]The coupling agent was 50 percent active Si69 which was provided by Degussa as X50S.
[7]6-PPD represents N-(1,3-dimethyl butyl)-N'-phenyl-p-phenylenediamine.
[8]CBS represents N-cyclohexyl-2-benzothiazyl-sulfenamide.
[9]DPG represents diphenyl guanidine.

The physical properties of the compounded tire tread formulations are reported in Table III.

TABLE III

| | Compound Physical Properties | | | | | |
|---|---|---|---|---|---|---|
| Example | 9 | 10 | 11 | 12 | 13 | 14 |
| 100% Modulus, MPa | 1.8 | 1.7 | 1.7 | 2.1 | 2.3 | 2.2 |
| 300% Modulus, MPa | 7.3 | 7.1 | 7.1 | 9.8 | 9.8 | 9.4 |
| Break Strength, MPa | 15.5 | 15.6 | 15.3 | 15.3 | 15.7 | 14.7 |
| Elongation at Break | 580% | 587% | 577% | 438% | 459% | 443% |
| Hardness @ 23° C. | 65.7 | 64.5 | 64.1 | 61.6 | 65.5 | 64.3 |
| Hardness @ 100° C. | 54.5 | 53.2 | 51.5 | 55.6 | 58.7 | 58.2 |
| Rebound @ 23° C. | 34.3 | 31.4 | 30.0 | 41.6 | 38.3 | 38.8 |
| Rebound @ 100° C. | 50.4 | 50.7 | 49.7 | 64.5 | 64.0 | 63.6 |

The high rebound at 100° C. reported in Examples 12–14 is indicative of improved rolling resistance in tire tread formulations. The lower rebound at room temperature suggests better traction characteristics. Thus, the tire tread compounds made with silica showed an exceptional combination of characteristics for utilization in tire treads.

Variations in the present invention are possible in light of the description of it provided herein. It is, therefore, to be understood that changes can be made in the particular embodiments described which will be within the full intended scope of the invention as defined by the following appended claims.

What is claimed is:

1. A high performance polybutadiene rubber blend for utilization in manufacturing tire tread compounds which is comprised of (a) a first polybutadiene rubber, (b) a second polybutadiene rubber, and (c) a third polybutadiene rubber; wherein the first polybutadiene rubber, the second polybutadiene rubber, and the third polybutadiene rubber are selected from the group of consisting of super-high vinyl polybutadiene rubbers having a vinyl content which is within the range of 80 percent to 100 percent, high vinyl polybutadiene rubbers having a vinyl content which is within the range of 60 percent to 79 percent, medium vinyl polybutadiene rubbers having a vinyl content which is within the range of 35 percent to 59 percent, and low vinyl polybutadiene rubbers having a vinyl content which is within the range of 8 percent to 34 percent; wherein at least three members selected from the group consisting of super-high vinyl polybutadiene rubbers, high vinyl polybutadiene rubbers, medium vinyl polybutadiene rubbers, and low vinyl polybutadiene rubbers are included in the blend, wherein at least one of the polybutadiene rubbers in the blend has a vinyl content which is within 35 percentage points of the vinyl content of at least one other polybutadiene rubber in the blend, wherein the vinyl content of the first polybutadiene rubber differs from the vinyl content of the second polybutadiene rubber and the third polybutadiene rubber by at least 5 percentage points, wherein the vinyl content of the second polybutadiene rubber differs from the vinyl content of the third polybutadiene rubber by at least 5 percentage points, wherein the blend as a whole has a total vinyl content of at least 40 percent, and wherein the blend contains at least 10 parts of the first polybutadiene rubber, at least 10 parts of the second polybutadiene rubber and at least 10 parts of the third polybutadiene rubber, based upon a total of 100 parts of rubber in the blend.

2. A high performance polybutadiene rubber blend as specified in claim 1 wherein at least one of the polybutadiene rubbers in the blend has a vinyl content which is within 30 percentage points of the vinyl content of at least one other polybutadiene rubber in the blend.

3. A high performance polybutadiene rubber blend as specified in claim 2 wherein the vinyl content of the first polybutadiene rubber differs from the vinyl content of the second polybutadiene rubber and the third polybutadiene rubber by at least 10 percentage points, and wherein the vinyl content of the second polybutadiene rubber differs from the vinyl content of the third polybutadiene rubber by at least 10 percentage points.

4. A high performance polybutadiene rubber blend as specified in claim 3 wherein the blend as a whole has a total vinyl content of at least about 45 percent.

5. A high performance polybutadiene blend as specified in claim 4 wherein the blend contains at least 20 parts of the first polybutadiene rubber, at least 20 parts of the second polybutadiene rubber and at least 20 parts of the third polybutadiene rubber, based upon a total of 100 parts of rubber in the blend.

6. A high performance polybutadiene rubber blend as specified in claim 5 wherein at least one of the polybutadiene rubbers in the blend has a vinyl content which is within 25 percentage points of the vinyl content of at least one other polybutadiene rubber in the blend.

7. A high performance polybutadiene blend as specified in claim 6 wherein the blend contains at least 25 parts of the first polybutadiene rubber, at least 25 parts of the second polybutadiene rubber and at least 25 parts of the third polybutadiene rubber, based upon a total of 100 parts of rubber in the blend.

8. A high performance polybutadiene rubber blend as specified in claim 7 wherein the first polybutadiene rubber is a super-high vinyl polybutadiene rubber, wherein the second polybutadiene rubber is a high vinyl polybutadiene rubber, and wherein the third polybutadiene rubber is a medium vinyl polybutadiene rubber.

9. A high performance polybutadiene rubber blend as specified in claim 1 wherein said blend is further comprised of silica.

10. A high performance polybutadiene rubber blend as specified in claim 9 wherein said blend is further comprised of a sulfur containing organosilicon compound.

11. A high performance polybutadiene rubber blend as specified in claim 10 wherein said sulfur containing organosilicon compound is selected from the group consisting of 3,3'-bis(trimethoxysilylpropyl)disulfide, 3,3'-bis(triethoxysilylpropyl)tetrasulfide, 3,3'-bis(triethoxysilylpropyl)octasulfide, 3,3'-bis(trimethoxysilylpropyl)tetrasulfide, 2,2'-bis-(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl)hexasulfide, 3,3'-bis(trimethoxysilylpropyl)octasulfide, 3,3'-bis(trioctoxysilylpropyl)tetrasulfide, 3,3'-bis(trihexoxysilylpropyl)disulfide, 3,3'-bis(tri-2"-ethylhexoxysilylpropyl)trisulfide, 3,3'-bis(triisooctoxysilylpropyl)tetrasulfide, 3,3'-bis(tri-t-butoxysilylpropyl)disulfide, 2,2'-bis(methoxy diethoxy silyl ethyl)tetrasulfide, 2,2'-bis(tripropoxysilylethyl)pentasulfide, 3,3'-bis(tricyclonexoxysilylpropyl)tetrasulfide, 3,3'-bis(tricyclopentoxysilylpropyl)trisulfide, 2,2'-bis(tri-2"-methylcyclohexoxysilylethyl)tetrasulfide, bis(trimethoxysilylmethyl)tetrasulfide, 3-methoxy ethoxy propoxysilyl 3'-diethoxybutoxysilylpropyltetrasulfide, 2,2'-bis(dimethyl methoxysilylethyl)disulfide, 2,2'-bis(dimethyl sec.butoxysilylethyl)trisulfide, 3,3'-bis(methyl butylethoxysilylpropyl)tetrasulfide, 3,3'-bis(di t-butylmethoxysilylpropyl)tetrasulfide, 2,2'-bis(phenyl methyl methoxysilylethyl)trisulfide, 3,3'-bis(diphenyl isopropoxysilylpropyl)tetrasulfide, 3,3'-bis(diphenyl cyclohexoxysilylpropyl)disulfide, 3,3'-bis-(dimethyl ethylmercaptosilylpropyl)tetrasulfide, 2,2'-bis(methyl dimethoxysilylethyl)trisulfide, 2,2'-bis(methyl ethoxypropoxysilylethyl)tetrasulfide, 3,3'-bis(diethyl methoxysilylpropyl)tetrasulfide, 3,3'-bis(ethyl di-sec.butoxysilylpropyl)disulfide, 3,3'-bis(propyl diethoxysilylpropyl)disulfide, 3,3'-bis(butyl dimethoxysilylpropyl)trisulfide, 3,3'-bis(phenyl dimethoxysilylpropyl)tetrasulfide, 3-phenyl ethoxybutoxysilyl 3'-trimethoxysilylpropyl tetrasulfide, 4,4'-bis(trimethoxysilylbutyl)tetrasulfide, 6,6'-bis(triethoxysilylhexyl)tetrasulfide, 12,12'-bis(triisopropoxysilyl dodecyl)disulfide, 18,18'-bis(trimethoxysilyloctadecyl)tetrasulfide, 18,18'-bis(tripropoxysilyloctadecenyl)tetrasulfide, 4,4'-bis(trimethoxysilyl-buten-2-yl)tetrasulfide, 4,4'-bis(trimethoxysilylcyclohexylene)tetrasulfide, 5,5'-bis(dimethoxymethylsilylpentyl)trisulfide, 3,3'- bis(trimethoxysilyl-2-methylpropyl)tetrasulfide, and 3,3'-bis(dimethoxyphenylsilyl-2-methylpropyl)disulfide.

12. A high performance polybutadiene rubber blend as specified in claim 11 wherein said blend is further comprised of carbon black.

13. A high performance polybutadiene rubber blend as specified in claim 12 wherein from about 10 phr to about 250 phr of silica is present, and wherein from about 5 phr to about 80 phr of carbon black is present.

14. A high performance polybutadiene rubber blend as specified in claim 13 wherein from about 0.01 to about 1 parts by weight of the sulfur containing organosilicon compound is present per part by weight of the silica.

15. A high performance polybutadiene rubber blend as specified in claim 14 wherein from about 15 phr to about 80 phr of silica is present, and wherein from about 10 phr to about 40 phr of carbon black is present.

* * * * *